(12) United States Patent
Stalker et al.

(10) Patent No.: US 8,695,859 B1
(45) Date of Patent: Apr. 15, 2014

(54) FRAMELESS HUNTING BLIND CONTAINED IN A FANNY PACK OR BACKPACK

(76) Inventors: Alan Stalker, Golden City, MO (US); Tim Pashia, Lamar, MO (US)

( * ) Notice: Subject to any disclaimer, the term of this patent is extended or adjusted under 35 U.S.C. 154(b) by 395 days.

(21) Appl. No.: 12/928,556

(22) Filed: Dec. 14, 2010

Related U.S. Application Data (60) Provisional application No. 61/288,806, filed on Dec. 21, 2009.

(51) Int. Cl.
*A45F 4/04* (2006.01)
*A45F 4/02* (2006.01)

(52) U.S. Cl.
USPC ............. 224/577; 224/154; 224/153; 135/95; 135/901

(58) Field of Classification Search
USPC ............. 224/576, 577, 153, 154; 135/90, 95, 135/901
See application file for complete search history.

(56) References Cited

U.S. PATENT DOCUMENTS

| | | | |
|---|---|---|---|
| 23,582 A | 4/1859 | Johns | |
| 33,468 A | 10/1861 | Short | |
| 33,528 A | 10/1861 | Johns | |
| 36,685 A | 10/1862 | Brecht et al. | |
| 39,150 A | 7/1863 | Joubert | |
| 46,195 A | 1/1865 | Weber | |
| 460,896 A | 10/1891 | Stiter | |
| 518,856 A | 4/1894 | Palmer | |
| 596,767 A | 1/1898 | Williams | |
| 646,421 A * | 4/1900 | Fisher | ................................. 2/89 |
| 650,554 A | 5/1900 | Conley | |
| 719,899 A | 2/1903 | Stacey | |
| 901,802 A | 10/1908 | Gotsche | |
| 1,048,806 A | 12/1912 | Burch | |
| 1,158,356 A | 10/1915 | Wilson | |
| 1,198,773 A | 9/1916 | Robinson | |
| 2,159,273 A | 5/1939 | Killinger | |
| 2,188,213 A | 1/1940 | Wilson | |
| 2,531,501 A | 11/1950 | Cline | |
| 2,567,697 A | 9/1951 | Craighead, Jr. et al. | |
| 2,584,432 A | 2/1952 | Marco | |
| 2,594,410 A | 4/1952 | Feldpausch | |
| 2,777,454 A | 1/1957 | Kramer | |
| 2,783,766 A * | 3/1957 | Kohlbeck | ..................... 135/100 |
| 2,819,776 A | 1/1958 | Balsam | |
| 2,841,159 A | 7/1958 | Graham | |
| 2,853,086 A | 9/1958 | Biagosch | |
| 3,034,523 A | 5/1962 | De Shano | |
| 3,116,808 A | 1/1964 | Riley | |
| 3,173,435 A | 3/1965 | Jaime | |

(Continued)

*Primary Examiner* — Adam Waggenspack
*Assistant Examiner* — Todd Anderson
(74) *Attorney, Agent, or Firm* — Jonathan A. Bay (57) ABSTRACT

A frameless hunting blind and fanny pack (or back pack) are combined. The pack has a belt (or shoulder strap) extending between clips. The pack also has, a case defining a main compartment with a zippered opening. A veil of camouflage material serves as the blind. The veil extends from an upper vertex to hang up high, and from there to an outspread bottom for staking to the ground. The veil has a spreading shape to simulate a root flare of a tree. The vertex is attached to the case of the pack and inside the main compartment. For travel, the veil is stuffed inside the main compartment and shut therein. In the field, the pack is taken off, the veil pulled and spread out, and the belt (or shoulder straps) is (are) belted around a tree trunk to provide the vertex with its high suspension point.

14 Claims, 7 Drawing Sheets

(56) References Cited

U.S. PATENT DOCUMENTS

| | | | |
|---|---|---|---|
| 3,288,157 A | 11/1966 | Szkolny | |
| 3,545,461 A * | 12/1970 | Carlson | 135/90 |
| 3,629,875 A | 12/1971 | Dow | 4/146 |
| 3,757,360 A | 9/1973 | Wescott | |
| 3,800,814 A | 4/1974 | Hibbert | 135/1 R |
| 3,822,813 A | 7/1974 | Carter | 224/25 A |
| 3,933,164 A | 1/1976 | Ness et al. | 135/1 R |
| 3,936,969 A | 2/1976 | Richard | 43/1 |
| 3,971,495 A | 7/1976 | Velazquez | 224/154 |
| 4,077,418 A | 3/1978 | Cohen | 135/95 |
| 4,114,633 A | 9/1978 | Herbez | 135/1 A |
| 4,164,089 A | 8/1979 | George | 43/1 |
| 4,234,005 A | 11/1980 | Taylor, III | 135/1 R |
| 4,331,272 A | 5/1982 | Ward | 224/154 |
| 4,332,266 A | 6/1982 | Wageley | 135/5 R |
| 4,438,876 A | 3/1984 | Ward | 224/154 |
| 4,449,542 A | 5/1984 | McSwain et al. | 135/98 |
| 4,505,286 A | 3/1985 | Madison | 135/90 |
| 4,526,307 A | 7/1985 | Parker | 224/154 |
| 4,537,210 A | 8/1985 | Montgomery | 135/87 |
| 4,606,070 A | 8/1986 | Schachter | 383/4 |
| 4,682,436 A | 7/1987 | Ritson | 43/1 |
| 4,716,919 A | 1/1988 | Griffin | 135/106 |
| 4,796,734 A | 1/1989 | Distasio | 190/1 |
| 4,805,655 A | 2/1989 | Justice | 135/90 |
| 4,825,578 A * | 5/1989 | Robinson | 43/1 |
| 4,862,906 A | 9/1989 | Jordon | 135/95 |
| 4,979,456 A | 12/1990 | Steward | 114/351 |
| 5,042,517 A | 8/1991 | Stewart | 135/90 |
| 5,133,378 A | 7/1992 | Tanasychuk | 135/109 |
| 5,564,125 A * | 10/1996 | Waldman et al. | 2/93 |
| 5,571,247 A | 11/1996 | Butler | 135/87 |
| 5,592,961 A | 1/1997 | Chin | 135/125 |
| 5,645,096 A | 7/1997 | Hazinski et al. | 135/126 |
| 5,762,085 A | 6/1998 | Punch | 135/93 |
| D404,866 S | 1/1999 | Surpless et al. | D34/1 |
| 5,865,355 A | 2/1999 | Camara | 224/153 |
| 6,003,749 A * | 12/1999 | Sabo | 224/576 |
| 6,021,794 A | 2/2000 | Guerra | 135/95 |
| 6,062,446 A | 5/2000 | Daneau | 224/154 |
| 6,085,767 A | 7/2000 | Maslow | 135/95 |
| 6,305,396 B1 | 10/2001 | Zheng | 135/126 |
| 6,351,851 B1 | 3/2002 | Yardan | 2/89 |
| 6,434,877 B1 | 8/2002 | Shelton | 43/1 |
| 6,510,922 B1 | 1/2003 | Hodnett | 182/187 |
| 6,698,131 B2 | 3/2004 | Latschaw | 43/1 |
| 6,823,883 B1 | 11/2004 | Sears | 135/128 |
| 7,040,333 B1 | 5/2006 | Ransom et al. | 135/126 |
| 7,051,908 B2 * | 5/2006 | Mignano | 224/153 |
| 7,182,091 B2 | 2/2007 | Maddox | 135/90 |
| 7,219,680 B2 | 5/2007 | Gresock | 135/90 |
| 7,225,823 B1 | 6/2007 | Ransom et al. | 135/126 |
| 7,246,630 B1 | 7/2007 | Ransom et al. | 135/90 |
| 7,775,230 B2 | 8/2010 | Lau | 135/126 |
| 8,333,309 B2 * | 12/2012 | Riddleberger | 224/153 |
| 2002/0078988 A1 | 6/2002 | Valpredo | |
| 2003/0024559 A1 | 2/2003 | Fields | |
| 2003/0116183 A1 | 6/2003 | Hill | |
| 2005/0183758 A1 | 8/2005 | Corbitt | |
| 2006/0076043 A1 | 4/2006 | Talley et al. | |
| 2008/0237281 A1 * | 10/2008 | Robinson | 224/154 |
| 2011/0215124 A1 * | 9/2011 | Riddleberger | 224/576 |
| 2013/0200125 A1 * | 8/2013 | Blair | 224/576 |

* cited by examiner

FRAMELESS HUNTING BLIND CONTAINED IN A FANNY PACK OR BACKPACK

CROSS-REFERENCE TO PROVISIONAL APPLICATION(S)

This application claims the benefit of U.S. Provisional Application No. 61/288,806, filed Dec. 21, 2009.

BACKGROUND AND SUMMARY OF THE INVENTION

The invention relates not only to portable hunting blinds but also to miscellaneous camouflage articles.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
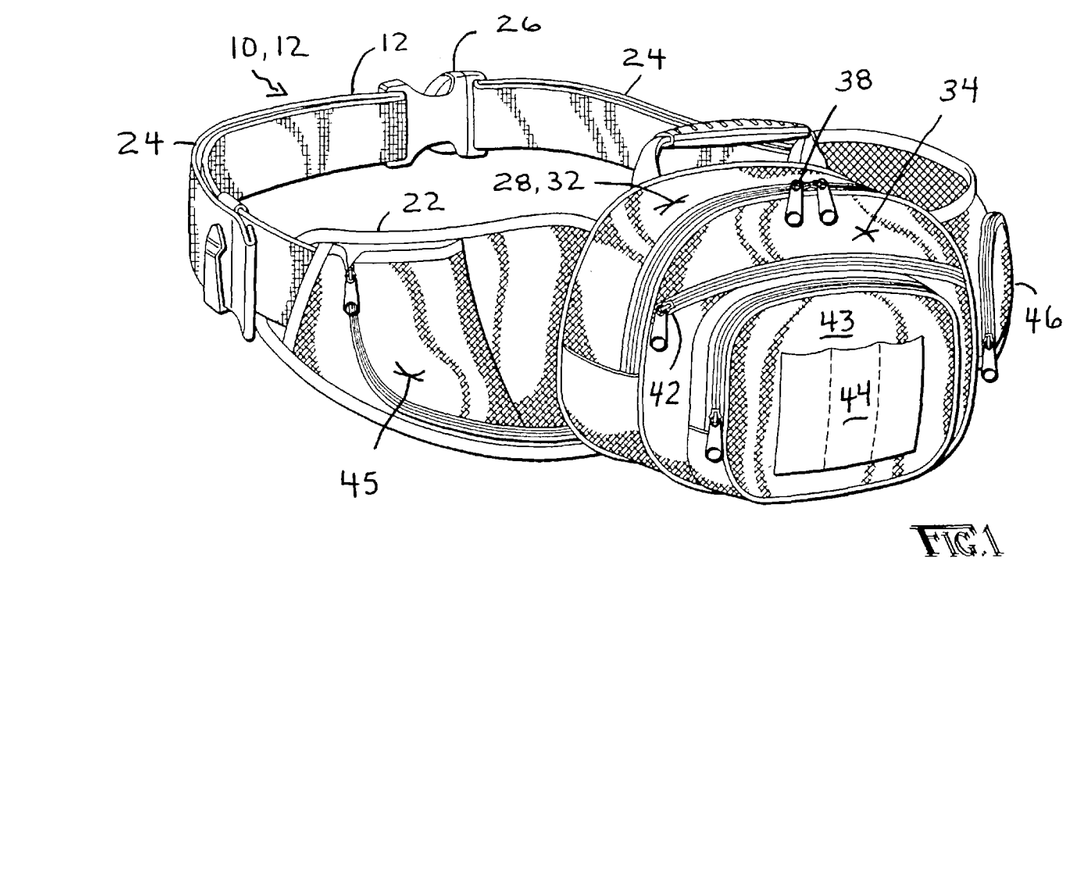
FIG. 1 is a perspective view of a combination frameless hunting blind and fanny pack in accordance with the invention, wherein the frameless hunting blind portion of the combination is stuffed inside a main compartment of the fanny pack portion, and hence hidden from view.
Figure 2:
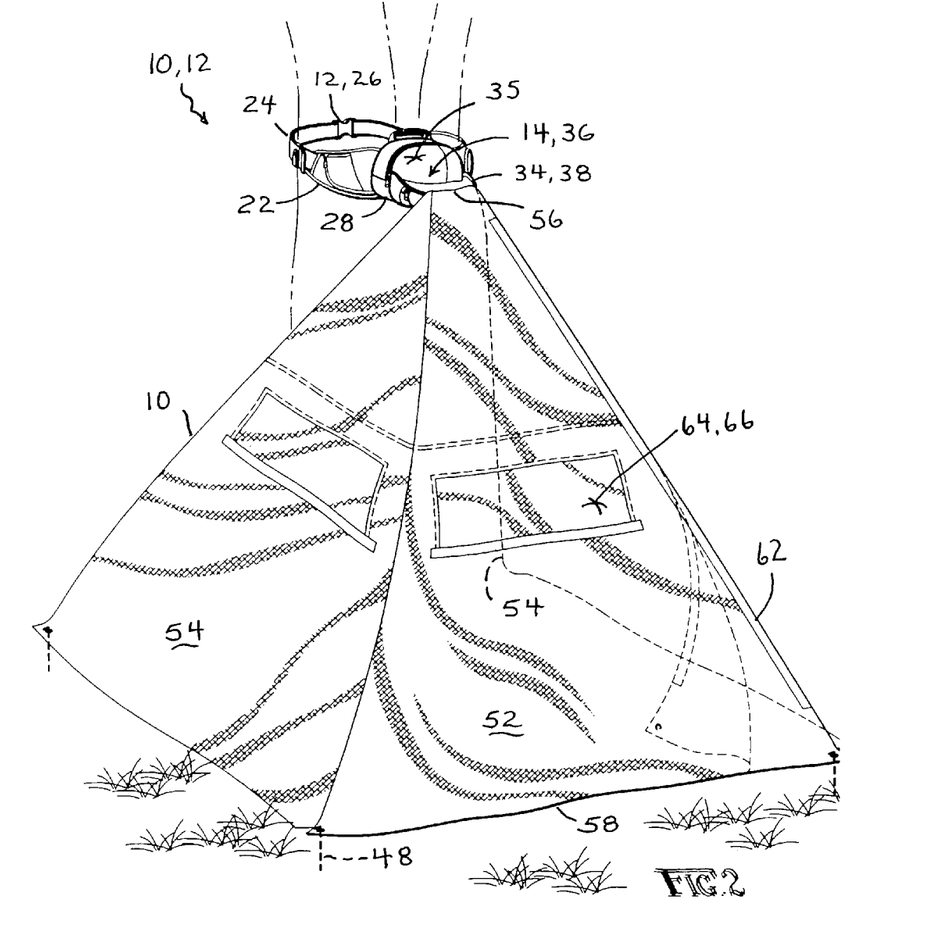
FIG. 2 is a reduced-scale perspective view of the combination frameless hunting blind and fanny pack in accordance with the invention, showing a manner of deployment of a veil of the hunting blind portion of the inventive combination.

FIGS. 1 and 2 show a combination frameless hunting blind and fanny pack 10 and 12 in accordance with the invention. FIG. 2 shows a manner of deployment of a veil 10 of web material that forms the hunting blind portion of the inventive combination frameless hunting blind and fanny pack 10 and 12. The manner of deployment shown by FIG. 2 is not necessarily a preferred manner, but is an exemplary manner for purposes of illustration and description. The veil 10, needless to say, provides a hunter with concealment. As will be more particular described below, the veil 10 deploys into the deployed position shown without any support from frames or framing.

FIG. 1 shows the result of stuffing the veil 10 back inside a main compartment 14 of the fanny pack portion 12 (and hence it is hidden from view in FIG. 1). Nevertheless, FIG. 1 shows the preferred manner of utilizing the combination frameless hunting blind and fanny pack 10 and 12 in accordance with the invention for carrying purposes in the field.

The fanny pack portion 12 comprises an intermediate compartmented back-portion 22 flanked by two closure belt portions 24 terminating in closures 26. Preferably the closure belt portions 24 comprise relatively wide, nylon strap material. Preferably the closures 26 comprise a form of plastic buckles, or clips. The closure belt portions 24 and closures 26 might have alternative configurations than nylon strap material and plastic clips. But by whatever configuration, it is preferred if the closure belt portions 24 and closures 26 allow for adjustability for lengthening and shortening over a wide range so that there is ample adjustment for over a relatively wide range of girths. This wide range of adjustability is preferred, not merely for adjusting to the waists of wearers of different girths, but more significantly for cinching tightly around a wide range of girths of miscellaneous mounting structures in the field. The preferred mounting structures are columnar, such as tree trunks. Wide range of adjustability is advantageous for service in cinching around small tree trunks (ie., smaller than most persons' waists) to large tree trunks (ie., larger than most persons' waists).

The intermediate compartmented back-portion 22 forms at least a portion of—or, alternatively, supports—a case 28 that defines the main compartment 14 for the fanny pack 12. The intermediate compartmented back-portion 22 preferably also supports or forms a series of auxiliary storage or carriage features 42-46. Preferably the intermediate compartmented back-portion 22 is produced of woven nylon fabric or the like that can withstand chemical attack from suntan lotion to insect repellent, as well as can withstand if not repel rain, snow, and the like.

As shown by the drawings, the case 28 that defines the main compartment 14 comprises a relatively flat, squashed-oval shape. That is, the case 28 has a tubular sidewall 32 that has squashed-oval shape. The sidewall 32 extends between an outer panel 34 with a squashed-oval shape and an inner panel 35 with a squashed-oval shape (see FIG. 2 and, between the two panels, the inner panel is the closest to the wearer's back). The inner panel 35 and sidewall 32 meet at a mating line and the inner panel 35 is joined to the sidewall 32 by a sewn seam all the way around the mating line. The outer panel 34 and sidewall 32 meet at a mating line. The outer panel 34 is joined to the sidewall 32 by a sewn seam for about the lower half of the mating line between the outer panel 34 and sidewall 32. The outer panel 34 and sidewall 32 form an opening 36 into the main compartment 14 over the upper half of this same mating line. Preferably the opening 36 into the main compartment 14 can be shut by a closure 38. It is an aspect of the invention to provide a closure 38 to the main compartment 14. Preferably the closure 38 comprises a zipper of nylon plastic or the like.

It is another aspect of the invention that the intermediate compartmented back-portion 22 of the fanny pack 12 include a variety of auxiliary storage or carriage features 42-46. FIG. 1 shows that the main compartment 14's outer panel 34 itself comprises a zippered pocket 42. Additionally, the outer panel 34 has a zippered pouch 43 formed on the outside of the outer panel 34. This zippered pouch 43 has a series of firearm-cartridge sleeves 44 sewn onto its outside. Unlike the woven nylon fabric of most of the intermediate compartmented back-portion 22, these firearm-cartridge sleeves 44 are produced of an elastic material in order to stretch around and hold the cartridges in place (none shown).

Figure 4:
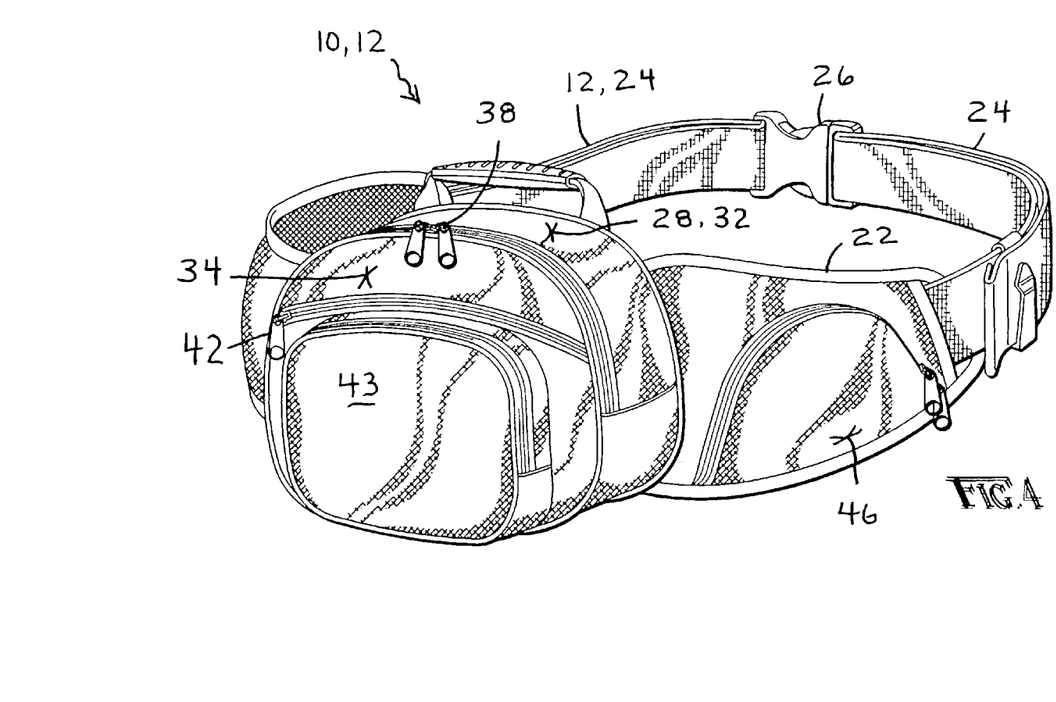
FIG. 4 is a perspective view comparable to FIG. 1 except from a right-rear vantage point (in contrast to a left-rear vantage point), and showing a slightly modified embodiment of the combination frameless hunting blind and fanny pack in accordance with the invention.

FIG. 1 furthermore shows that intermediate compartmented back-portion 22 further comprises an open-top slide-in water-bottle sleeve 45 (eg., this location is more or less above the left-rump of the wearer). This water-bottle sleeve 45 might incorporate elastic material like the firearm-cartridge sleeves 44 and/or include a zippered seam to facilitate insertion and removal of a wide-bottomed water-bottle (not shown). FIG. 4 shows indeed at another zippered pouch 46, this one at the location of more or less above the right-rump of the wearer. Either this zippered pouch 46 or else the zippered pouch 43 can be put in service of toting a set of stakes 48, which are shown in FIG. 2.

To turn to FIG. 2, it shows better an exemplary manner of deployment of the combination frameless hunting blind and fanny pack 10 and 12 in accordance with the invention for hunter concealment purposes.

A hunter (not shown) is concealed in accordance with the invention by the veil 10. It is a preference in accordance with the invention that the veil 10 is printed with or otherwise carries camouflage indicia on it (eg., see FIG. 3). The veil 10 can be made of natural or synthetic web material, like fabric and so on. It is preferred that the veil 10 is produced from a particular web material, namely, semi-transparent netting. That way, if the hunter is wearing camouflage apparel, the hunter's outline is already indistinct without the help of the camouflage veil 10 netting. However, if the hunter is concealed behind the camouflage veil 10 netting and is also wearing camouflage apparel, the hunter will be virtually invisible.

FIG. 2 shows a preferred configuration of the veil 10 as comprising three triangular panels 52 and 54 forming three walls of a pyramid. Two panels 54 are spaced apart by a central panel 52. Arguably, the two spaced apart panels 54 in FIG. 2 could be drawn together at the rear so that the veil 10 as a whole forms a different kind of pyramidal shape, namely, a tetragon. However, in use, it is probably better to avoid stretching the panels 52 and 54 of veil 10 as taut as shown, and for camouflage reasons as more particularly described below.

Pause can be taken to turn to the topic of the use of the combination frameless hunting blind and fanny pack 10 and 12 in accordance with the invention.

The veil 10 is produced to have the form of a spreading shape, from an upper vertex 56 to an outspread bottom edge 58. The spreading shape can take on any of a pyramidal shape, a teepee shape, a flaring root-flare shape, an irregularly-pleated flaring root-flare shape, and so on. In the preferred embodiment, FIG. 2 shows that the veil 10's central triangular panel 52 converges to an upper edge 56. This upper edge 56 is the vertex 56 for the veil 10, albeit not a point but an edge 56 to form a seam. The vertex 56 is attached to the fanny pack 12. The vertex 56 can either be permanently attached, or removably attached. One way to permanently attach the vertex 56 is to sew it into the main compartment 14's underside zipper 38 (on the inside thereof, needless to say). Conversely, a way to removably attach the vertex 56 is to join it by a zippered seam with the main compartment 14's outer panel 34, on the inside of the main compartment 14, and again preferably below the underside zipper 38 (this is not shown).

The veil 10's outer two triangular panels 54 preferably converge to respective vertices that emanate from the ends of the central panel 52's vertex seam 56. The outer triangular panels 54 are joined to the central triangular panel 52 along respective mating lines, one of which is preferably a sewn seam, the other mating line having a hook-and-pile closure (eg., VELCRO®) and thereby defining a portal 62 for the veil 10. That way, the occupant of the blind can let him or herself in and out at pleasure through the portal 62.

Given the foregoing, the user of the combination frameless hunting blind and fanny pack 10 and 12 in accordance can stuff the veil 10 into the main compartment 14 and zipper it shut by zipper 38. Then the user can belt the combination frameless hunting blind and fanny pack 10 and 12 around his or her waist in the typical manner of a fanny pack. After that, he or she can trek into the field to the destination for the blind set-up. The fanny-pack style of wearing the combination frameless hunting blind and fanny pack 10 and 12 does allow the possibility of the wearer wearing a backpack too, without mutual interference.

The purpose for attaching the veil 10 to the fanny pack 12 is not so much to ensure that the veil 10 is packed and not forgotten.

Instead, the primary purpose for attaching the veil 10 to the fanny pack 12 is for converting the fanny pack 12 into a hanger in the field, like for hanging the fanny pack 12 to a tree trunk as by belting the fanny pack 12 around the tree trunk. Thus the fanny pack 12 serves as the hanger—or high suspension point—for the veil 10.

It is another aspect of the invention that the preferred spreading shape for the veil 10 is not the taut pyramid as shown in FIG. 2. Instead, the preferred spreading shape would be more like an irregularly-pleated flaring root-flare shape of a tree. It is believed that the preferred shape would more naturally simulate a natural shape in nature. It is believed that the crisp, creased edges as shown in FIG. 2 would stand out as unnatural, and diminish the concealing effectiveness of the veil 10.

It is a further aspect of the invention that the closure belt portions 24 and closures 26 provide an ample range of adjustability because, since most often the closure belt portions 24 and closures 26 are going to belt a tree trunk pretty low to the ground, then for some pretty big trees that girth is going to be fairly sizable.

It is a preference of the invention that the veil 10 is removable from the fanny pack 12. This is not so much for the purpose of converting the fanny pack 12 from special purpose use to general purpose use. Instead, the advantage of a removable veil 10 is it provides the user with the opportunity to swap veils 10 and 10a of different configurations or different camouflage patterns, as according to season or ecosystem and the like.

FIG. 2 shows that the stakes 48 advantageously pin the veil 10's bottom edge 58 to the ground. This prevents a gust of wind from lifting the veil 10, and revealing the no-longer concealed hunter.

Figure 3:
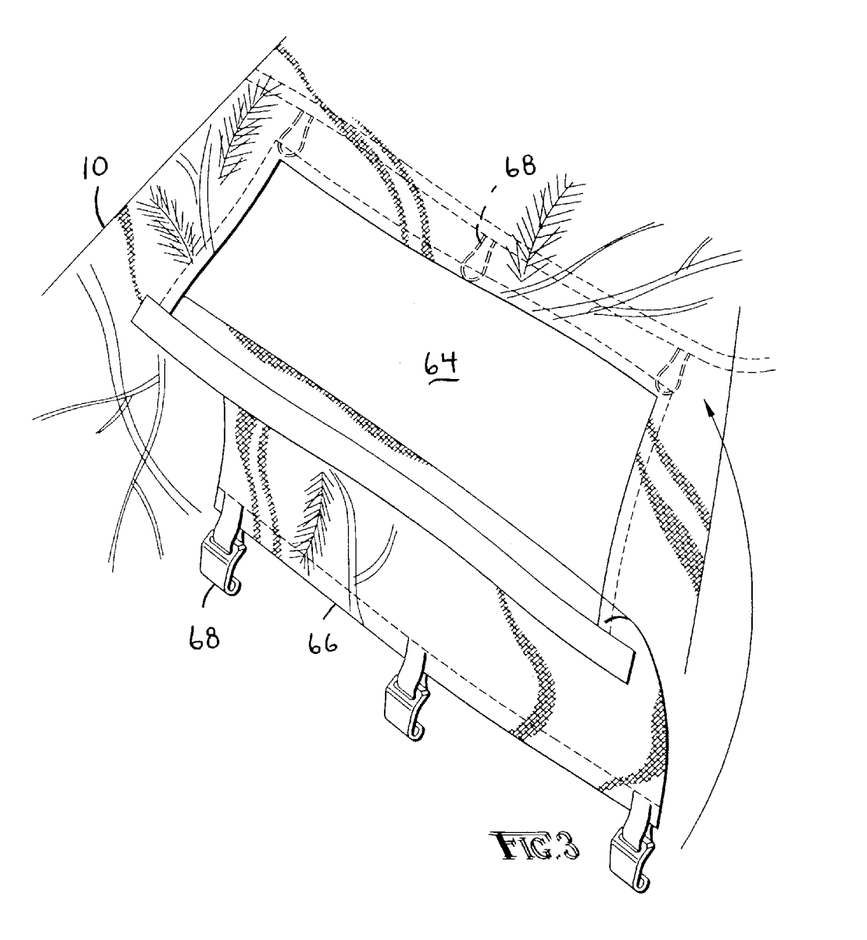
FIG. 3 is an enlarged-scale perspective view isolating on the left one of the two shooting windows in FIG. 2, it being shown open and with portions of the surrounding veil removed from the view.

FIG. 2 shows that the veil 10 has one or more shooting windows 64. If there are plural windows 64, then preferably the windows 64 are angularly distributed about the veil 10. In FIG. 2, each of the three panels 52 and 54 has its own shooting window 64 (only two shooting windows 64 are in view). FIG. 3 shows one such window 64 in isolation. The window 64 comprises a rectangular aperture in the veil 10. The window 64 is normally closed by a rectangular flap 66 of the same material as the veil 10.

The flap 66 is sewn to the bottom sill of the window 64. The flap 66 includes a closure 68 to secure it to the top sill of the window 64 for shutting the window 64. The closure 68 might comprise bungee cord loops and plastic hooks (as shown).

Alternatively, the closure 68 might comprise a set of magnets (not shown). It is an aspect of the invention that the window closures 68 operate quieter than the other closures mentioned previously, including zippers, snap-in clips, buckles and/or hook-and-pile fasteners.

Figure 5:
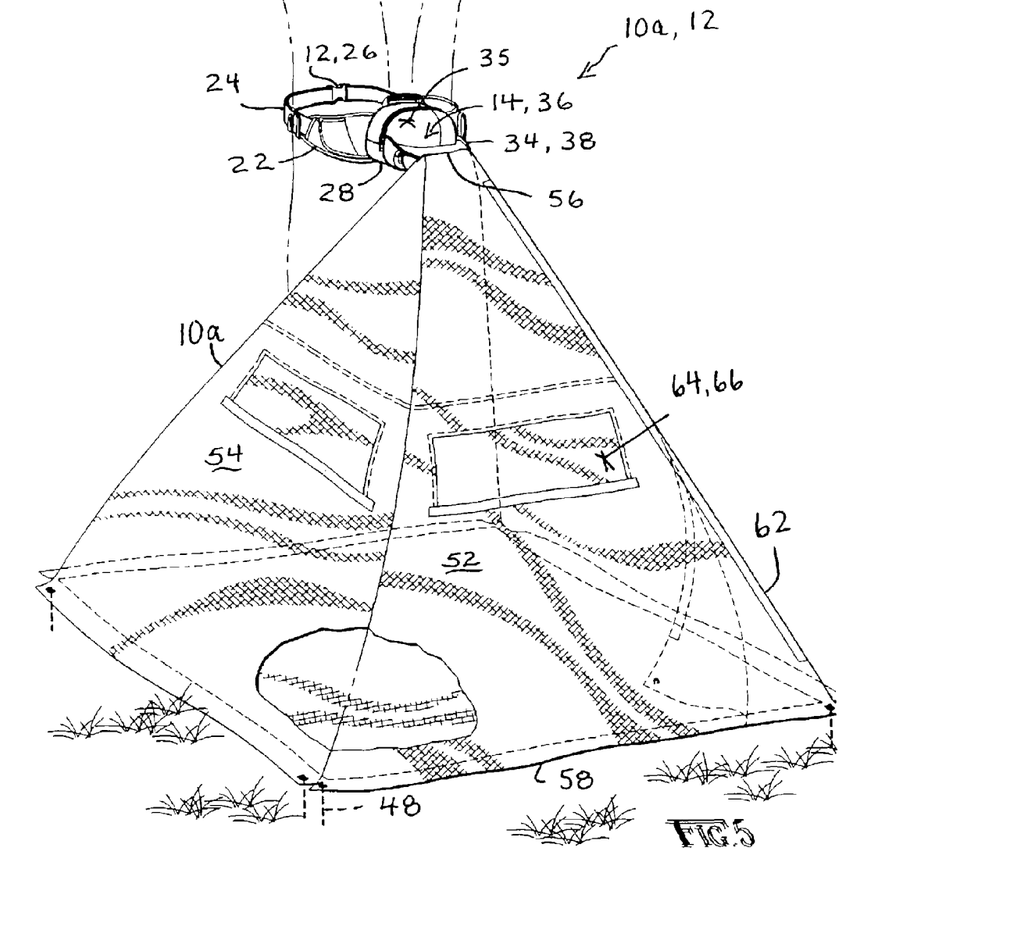
FIG. 5 is a perspective view comparable to FIG. 2 except showing an alternate embodiment of the veil of said combination frameless hunting blind and fanny pack in accordance with the invention in accordance with the invention.

FIG. 5 shows an alternate embodiment of the combination frameless hunting blind and fanny pack 10a and 12 in accordance with the invention, including an alternate embodiment of the veil 10a. This veil 10a forms a tent, with a full three-dimensional surrounding wall and floor. The purpose of providing a full three-dimensional enclosure for the hunter is not so much to provide the hunter with a bed-down place at night, but more for the purpose of combating insects. Anymore, some game seasons are during some of the warmest months of the year, and the biting insects are bad then. This includes without limitation the dove season in the Midwest.

In any event, the preferred dimensions for the veil 10a in accordance with the invention preclude it from serving as a tent. That is, it is preferred if the veils 10/10a—when fully stretched out, which is not preferred, but if they were—it is preferred if the veils 10/10a measures at the tallest about five feet high off the ground (~1½ m) and about five feet by five feet on the ground (~1½ m by ~1½ m). The shooting windows 64 might measure for sake of example and without limitation about sixteen inches wide by six inches high (~40 cm wide by ~15 cm high).

Again, it is an aspect of the invention that the veils 10/10a are attached to the fanny pack 12, not only to ensure that the veils 10/10a are indeed stuffed into the main compartment 14 and not forgotten, but also so that the closure belt portions 24 and closures 26 serve in the field as the preferred means of mounting to a tree trunk or the like. Following that, the fanny pack 12 serves as the high suspension point for the spreading veils 10/10a.

The fanny pack 12's auxiliary compartments 42-46 serve as practical places to stow (for example and without limitation) stakes 48, which are useful for pinning down the bottom edge 58 of the veils 10/10a. Such auxiliary compartments 42-46 might stow an emergency nail or tack (not shown). That way, if the closure belt portions 24 and closures 26 fail to gain purchase on the tree trunk and perpetually slip, then a nail or the like can be driven by a rock underneath the fanny pack 12 to stop it. The nail can just be left behind at the end of the day.

It is an aspect of the invention that the veils 10/10a are compact. The hunting blind created by the veils 10/10a is comparably compact. The combination frameless hunting blind and fanny pack 10/10a and 12 in accordance with the invention is quick to set up by a single user/wearer thereof. It is just as quick to take down and move to a second position as desired. Being frameless, the veils 10/10a readily stuff into the main compartment 14 for re-location. The combination frameless hunting blind and fanny pack 10/10a and 12 as a whole, since it is frameless, requires no—and uses no—frames or framing to erect and stretch out the veils 10/10a. If there were frames (there are not), such frames would have to be specifically handled before and after each use. Hence the absence of frames tremendously speeds up the set up and take down time. The absence of frames also lessens the carrying burden. Moreover, the absence of frames lessens the risk of lost or left-behind parts which would render the blind unusable.

Another advantage to being frameless is the way the deployed veils 10/10a preferably slump and spread like the irregularly-pleated flaring root flare of a tree. That way, the veils 10/10a adopt a pattern more natural in nature (needless to say) and not introduce straight lines that would give the blind an unnatural aspect.

It is preferred if the veils 10/10a are sized and configured such that the hunter adopts a seated posture inside the veils 10/10a. That is, preferably the hunter can find a rock or log to sit upon or, better still, bring along a small collapsible seat (not shown). The hunter would then secure the closure belt portions 24 and closures 26 on the tree trunk at the elevation chosen such that the shooting windows 64 would be about shoulder high.

In addition, that same elevation would put the firearm-cartridge sleeves 44 (sewn onto the outside of the main compartment 14's outer panel 34) at just slightly over the hunter's forehead, on the inside of the veil 10 or 10a. The firearm-cartridge sleeves 44 hold surplus ammunition. But the surplus ammunition does not have to be specifically handled during the set up and take down of the combination frameless hunting blind and fanny pack 10/10a and 12 in accordance with the invention. The surplus ammunition is on the outside of the fanny pack 12 during non-use and/or travel. Then, after set up, the surplus ammunition automatically ends up being on the inside of the veil 10 or 10a and within a comfortable reach for the hunter.

Given the foregoing, the hunter is concealed to a high degree, and has comfortably-placed shooting windows 44 to shoot out of as well as surplus ammunition within comfortable reach too for a superior hunting blind experience.

Figure 6:
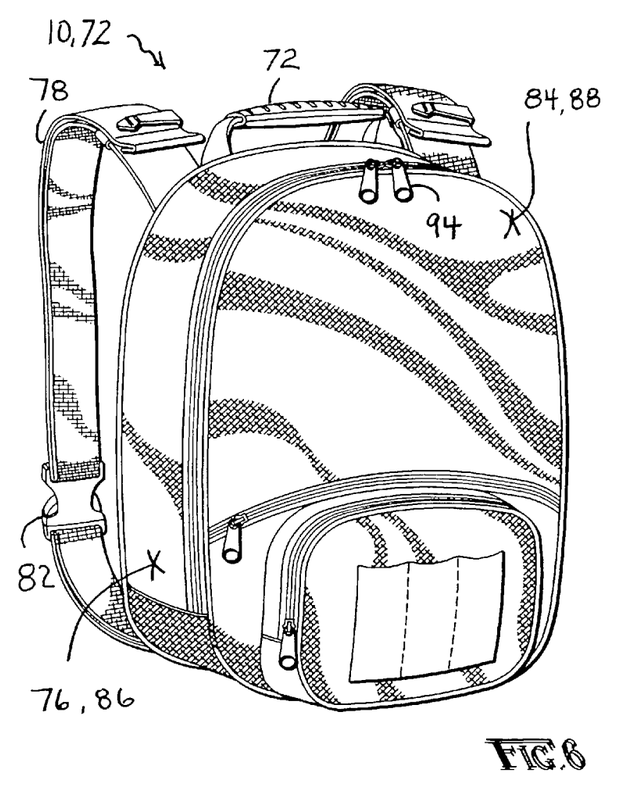
FIG. 6 is a perspective view of a combination frameless hunting blind and backpack in accordance with the invention, wherein the frameless hunting blind portion of the combination is stuffed inside a main compartment of the backpack portion.
Figure 7:
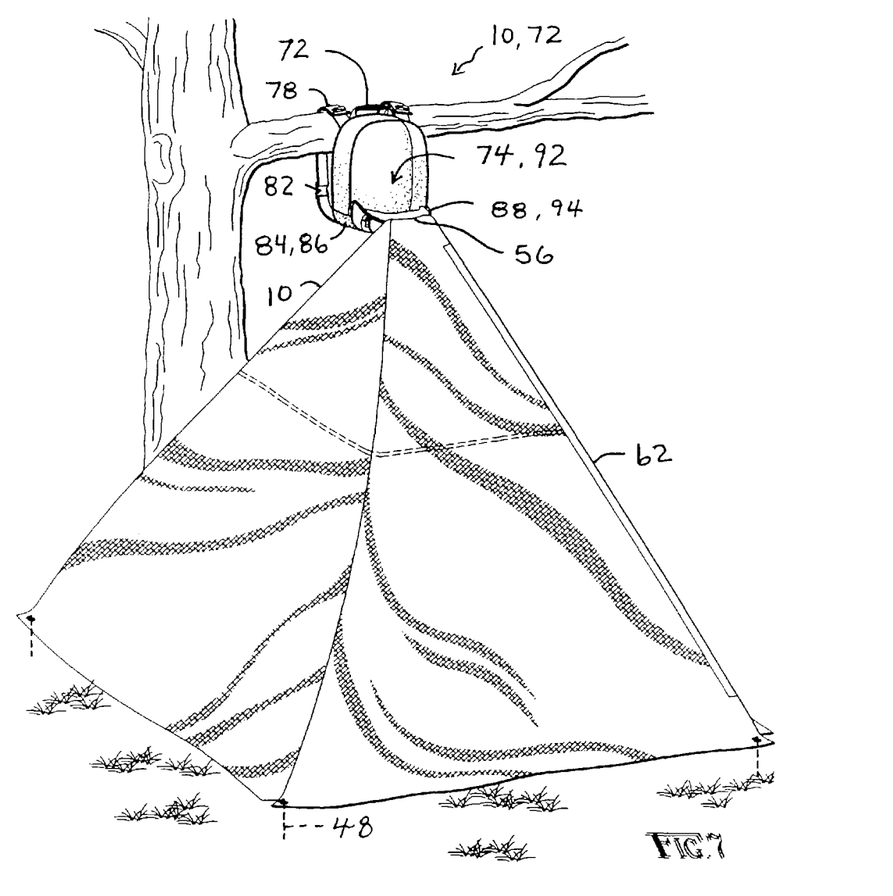
FIG. 7 is a reduced-scale perspective view of the combination frameless hunting blind and backpack of FIG. 7, showing a manner of deployment of a veil of the hunting blind portion of the inventive combination.

FIGS. 6 and 7 show a combination frameless hunting blind and backpack 10 and 72 in accordance with the invention. FIG. 7 shows deployment of the veil 10 that forms the hunting blind portion, as comparably shown in FIGS. 2 and 5. It is an advantage in this embodiment of the invention that, the backpack portion 72 allows the wearer to carry an extra-sized veil 10 (see FIG. 7). That way, in cases when the wearer is hunting in a party, it is possible to conceal two or more hunters (eg., the whole party) underneath the veil 10.

FIG. 6 shows the result of stuffing the veil 10 back inside a main compartment 74 of the backpack portion 72 (and hence it is hidden from view in FIG. 6). Nevertheless, FIG. 6 shows the preferred manner of utilizing the combination frameless hunting blind and backpack 10 and 72 in accordance with the invention for carrying purposes in the field.

The backpack portion 72 comprises a compartmented back-portion 76 flanked by left and right shoulder straps 78 belted and unbelted by closures 82. Preferably the shoulder straps 78 comprise relatively wide, nylon strap material. Preferably the closures 82 comprise a form of plastic buckles, namely, plastic clips. The shoulder straps 78 and closures 82 might have alternative configurations than nylon strap material and plastic clips. But again, it is preferred if the shoulder straps 78 and closures 82 allow for adjustability for lengthening and shortening over a wide range so that there is ample adjustment for over a relatively wide range of girths.

The compartmented back-portion 76 forms a case 84 that defines the main compartment 74 for the backpack 72. The compartmented back-portion 76 preferably also supports or forms a series of auxiliary storage or carriage features 42-44. Preferably the compartmented back-portion 76 is produced of woven nylon fabric or the like.

The case 84 has a tubular sidewall 86 that is closed by an outer panel 88. The outer panel 88 and sidewall 86 meet at a mating line. The outer panel 88 is joined to the sidewall 86 by a sewn seam for about the lower half of the mating line between the outer panel 88 and sidewall 86. The outer panel 88 and sidewall 86 form an opening 92 (see FIG. 7) into the main compartment 74 over the upper half of this same mating line. Preferably the opening 92 into the main compartment 74 can be shut by a closure 94. It is an aspect of the invention to provide a closure 94 to the main compartment 74. Preferably the closure 94 comprises a zipper of nylon plastic or the like.

It is another aspect of the invention that the compartmented back-portion 76 of the backpack 72 include a variety of auxiliary storage or carriage features 42-46. FIG. 6 shows that the main compartment 74's outer panel 88 itself comprises a zippered pocket 42. Additionally, the outer panel 88 has a zippered pouch 43 formed on the outside of the outer panel 88. This zippered pouch 43 has a series of firearm-cartridge sleeves 44 sewn onto its outside, and so on.

FIG. 7 shows an exemplary manner of deployment of the combination frameless hunting blind and backpack 10 and 72 in accordance with the invention for hunter concealment purposes. As in FIGS. 1 through 5 for the fanny pack 12, the vertex 56 in FIGS. 6 and 7 is attached to the backpack 72. The vertex 56 can either be permanently attached, or removably attached. One way to permanently attach the vertex 56 is to sew it into the main compartment 74's underside zipper 94 (on the inside thereof, needless to say). Conversely, a way to removably attach the vertex 56 is to join it by a zippered seam with the main compartment 74's outer panel 88, on the inside of the main compartment 74, and again preferably below the underside zipper 94 (this is not shown).

Given the foregoing, the user of the combination frameless hunting blind and backpack 10 and 72 in accordance can stuff the veil 10 into the main compartment 74 and zipper it shut by zipper 94. Then the user can shoulder on the combination frameless hunting blind and backpack 10 and 72 over his or her shoulders in the typical manner of a backpack. After that, he or she can trek into the field to the destination for the blind set-up. The backpack style of wearing the combination frameless hunting blind and backpack 10 and 72 does allow the possibility of the wearer wearing a fanny pack too, without mutual interference.

The purpose for attaching the veil 10 to the backpack 72 is not so much to ensure that the veil 10 is packed and not forgotten.

Instead, the primary purpose for attaching the veil 10 to the backpack 72 is for converting the backpack 72 into a hanger in the field, like for hanging the backpack 72 to a tree limb or shaft as by looping the shoulder loops around such a tree limb. Thus the backpack 72 serves as the hanger—or high suspension point—for the veil 10.

It is a preference of the invention that the veil 10 is removable from the backpack 72. This is not so much for the purpose of converting the backpack 72 from special purpose use to general purpose use. Instead, the advantage of a removable veil 10 is it provides the user with the opportunity to swap veils 10 and 10a of different configurations or different camouflage patterns, as according to season or ecosystem and the like.

And once again, it is an aspect of the invention that the combination frameless hunting blind and backpack 10/10a and 72 is frameless. It requires no—and uses no—frames to stretch the veil 10 (or 10a). If there were frames (there are not), such frames would have to be specifically handled before and after each use. Hence the absence of frames tremendously speeds up the set up and take down time. The absence of frames also lessens the carrying burden. Moreover, the absence of frames lessens the risk of lost or left-behind parts which would render the blind unusable.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A combination frameless hunting blind and backpack, comprising:

a backpack having a shoulder strap coupled and uncoupled by a closure;

a veil of web material adapted for service as a blind, and extending from an upper vertex to hang from a high suspension point to an outspread bottom for resting on the ground, and also having a spreading shape adapted for one or more hunters to be concealed behind;

said backpack forming a case;

said case being formed with an opening, and having a closure for the opening, as well as defining a compartment adapted for the veil to be stuffed and shut closed inside for travel;

said vertex being attached to the backpack wherein when packed for travel the veil is stuffed and shut inside the compartment and when deployed for use said shoulder straps and closures are adapted to loop around a shaft in the field;

wherein the spreading shape can take on any of a pyramidal shape, a teepee shape, a flaring root-flare shape, or an irregularly-pleated flaring root-flare shape;

wherein the outspread bottom flares the veil angularly underneath the suspended vertex such that the veil flares to form at least 180° surround around a user concealed behind and inside the flared veil; and wherein the spreading shape of the veil converges into said vertex which ranges in extent from being a point to an edge that is too abbreviated to wrap fully around the user's waist and be cinched underneath by a belt;

whereby the backpack defines the high suspension point and the veil is adapted to be outspread in the spreading shape under the high suspension point;

said case being formed such that said opening comprises a horizontal span when shut;

said case having an underside edge and an upperside edge defining said opening therebetween;

said veil being formed such that the vertex comprises a short span of an edge of the web material;

said vertex being attached to the case inside the compartment and under the underside edge;

said case further comprises further compartments and/or firearm-cartridge sleeves below the elevation of the underside edge, whereby ammunition stored in said further compartments and/or firearm-cartridge sleeves is accessed by the user from the outside of the backpack during non-use and/or travel, but then after set up of the veil in the form of a deployed blind, the ammunition stored in said further compartments and/or firearm-cartridge sleeves is accessed by the user while concealed inside the surrounds of blind, behind and inside the outspread veil.

2. The combination frameless hunting blind and backpack of claim 1 wherein:

said spreading shape of the veil converges into said vertex which ranges in extent from being a point to an edge that is shorter than the horizontal extent of the case of the backpack.

3. The combination frameless hunting blind and backpack of claim 2 wherein:

said spreading shape of the veil converges into said vertex which ranges in extent from being a point to an edge that is shorter than the horizontal extent of the opening of the case of the backpack.

4. The combination frameless hunting blind and backpack of claim 1 wherein:
said veil comprises at least two triangular panels of web meeting at a mating line along one edge thereof and forming a seam therebetween, whereby the veil can be outspread in a tetragon shape except missing not only a rear panel but also a floor panel.

5. The combination frameless hunting blind and backpack of claim 4 wherein:
said veil comprises at least three triangular panels of web comprising two outer panels and a central panel meeting at respective mating lines along two edges of said central panel with one and the other of the outer panels, whereby the veil can be outspread in a pyramid shape except missing not only a rear panel but also a floor panel.

6. The combination frameless hunting blind and backpack of claim 5 wherein:
said blind is characterized by a given elevation at which in at least one of the panels is formed with a window adapted for user to shoot a firearm therethrough;
wherein window is formed in the at least one panel such that the window is a horizontally-elongated rectangle, and, the horizontal extent of the window is over half the horizontal width of said at least one panel the given elevation thereof.

7. The combination frameless hunting blind and backpack of claim 6 wherein:
said at least one panel further comprises a closable flap for said window.

8. The combination frameless hunting blind and backpack of claim 5 wherein:
said blind is characterized by a given elevation at which in at least two of the panels are formed with a window adapted for user to shoot a firearm therethrough;
wherein each window is formed in each of the at least two panels such that each window is a horizontally-elongated rectangle, and, the horizontal extent of each window is over half the horizontal width of the respective panel at the given elevation thereof.

9. A combination frameless hunting blind and fanny pack, comprising:
a fanny pack comprising an intermediate compartmented back-portion flanked by two closure belt portions terminating in terminal closures;
a veil of web material adapted for service as a blind, and extending from an upper vertex to an outspread bottom adapted for resting on a base plane, and also having a spreading shape adapted for a hunter to be concealed behind;
the intermediate compartmented back-portion forms at least a portion of, or supports, a case;
said case being formed with an opening, and having a closure for the opening, as well as defining a compartment adapted for the veil to be stuffed and shut closed inside for travel;
said vertex being attached to the fanny pack wherein when packed for travel the veil is stuffed and shut inside the compartment and when deployed for use said closure belt portions and terminal closures are adapted to belt around and suspend the vertex from a columnar mounting structure in the field;
wherein the spreading shape can take on any of a pyramidal shape, a teepee shape, a flaring root-flare shape, or an irregularly-pleated flaring root-flare shape;
wherein the outspread bottom flares the veil angularly underneath the suspended vertex such that the veil flares to form at least 180° surround around a user concealed behind and inside the flared veil; and
the spreading shape of the veil converges into said vertex which ranges in extent from being a point to an edge that is too abbreviated to wrap fully around the user's waist and be cinched underneath the belted fanny pack, including not only the intermediate compartmented back-portion thereof but also the two flanking belt portions thereof as well;
whereby the veil hangs by the vertex thereof from the belted fanny pack and is adapted to be outspread in the spreading shape about the columnar mounting structure, with the bottom edge resting on the base plane;
wherein said spreading shape of the veil converges into said vertex which ranges in extent from being a point to an edge that is shorter than the horizontal extent of the intermediate compartmented back-portion of the fanny pack;
said case being formed such that said opening comprises a horizontal span when shut;
said case having an underside edge and an upperside edge defining said opening therebetween;
said veil being such that the vertex comprises a short span of an edge of the web material;
said vertex being attached to the case inside the compartment and under the underside edge;
said case further comprises further compartments and/or firearm-cartridge sleeves below the elevation of the underside edge, whereby ammunition stored in said further compartments and/or firearm-cartridge sleeves is accessed by the user from the outside of the fanny pack during non-use and/or travel, but then after set up of the veil in the form of a deployed blind, the ammunition stored in said further compartments and/or firearm-cartridge sleeves is accessed by the user while concealed inside the surrounds of blind, behind and inside the outspread veil.

10. The combination frameless hunting blind and fanny pack of claim 9 wherein:
said veil comprises at least two triangular panels of web meeting at a mating line along one edge thereof and forming a seam therebetween, whereby the veil can be outspread in a tetragon shape except missing not only a rear panel but also a floor panel.

11. The combination frameless hunting blind and fanny pack of claim 10 wherein:
said veil comprises at least three triangular panels of web comprising two outer panels and a central panel meeting at respective mating lines along two edges of said central panel with one and the other of the outer panels, whereby the veil can be outspread in a pyramid shape except missing not only a rear panel but also a floor panel.

12. The combination frameless hunting blind and fanny pack of claim 11 wherein:
said blind is characterized by a given elevation at which in at least one of the panels is formed with a window adapted for user to shoot a firearm therethrough;
wherein window is formed in the at least one panel such that the window is a horizontally-elongated rectangle, and, the horizontal extent of the window is over half the horizontal width of said at least one panel the given elevation thereof.

13. The combination frameless hunting blind and fanny pack of claim 12 wherein:
   said at least one panel further comprises a closable flap for said window.

14. The combination frameless hunting blind and fanny pack of claim 11 wherein:
   said blind is characterized by a given elevation at which in at least two of the panels are formed with a window adapted for user to shoot a firearm therethrough;
   wherein each window is formed in each of the at least two panels such that each window is a horizontally-elongated rectangle, and, the horizontal extent of each window is over half the horizontal width of the respective panel at the given elevation thereof.

* * * * *